United States Patent [19]
Mason

[11] 3,972,130
[45] Aug. 3, 1976

[54] MULTISPEED TIMER DRYER CONTROL

[75] Inventor: Anthony Mason, St. Joseph, Mich.

[73] Assignee: Whirlpool Corporation, Benton Harbor, Mich.

[22] Filed: Sept. 30, 1974

[21] Appl. No.: 510,406

Related U.S. Application Data

[62] Division of Ser. No. 364,731, May 29, 1973, Pat. No. 3,886,802.

[52] U.S. Cl. ................................ 34/45; 34/53; 34/55
[51] Int. Cl.² ........................................ F26B 19/00
[58] Field of Search ............................ 34/45, 53, 55

[56] References Cited
UNITED STATES PATENTS

| | | | |
|---|---|---|---|
| 3,286,359 | 11/1966 | Orr et al. | 34/12 |
| 3,398,461 | 8/1968 | Janke | 34/45 |
| 3,571,945 | 3/1971 | Elders | 34/53 |
| 3,783,529 | 1/1974 | Miller et al. | 34/45 |

Primary Examiner—John J. Camby
Assistant Examiner—Larry I. Schwartz
Attorney, Agent, or Firm—Hill, Gross, Simpson, Van Santen, Steadman, Chiara & Simpson

[57] ABSTRACT

A timer for a dryer includes an axially movable shaft operated by a face cam and carrying a movable gear which provides different gear ratios in a gear train between the timer motor and a camstack. The driving arrangement reduces the drive speed of the camstack so that only a small portion of the timer dial is utilized during the time in which the face cam shifts the gear train into the low speed mode of operation. Another cam mounted for mutual rotation with a gear which is ahead of the movable gear and thereby unaffected by the gear shifting operation includes a lobe which operates a contact in series with the dryer drive motor to provide intermittent operation of the motor and thus intermittent tumbling of the clothes in the rotatable drum driven by the drive motor.

2 Claims, 7 Drawing Figures

MULTISPEED TIMER DRYER CONTROL

This is a division, of application Ser. No. 364,731, filed May 29, 1973 now U.S. Pat. No. 3,886,802.

BACKGROUND OF THE INVENTION

1. Field of the Invention

This invention relates to a multispeed timer dryer control which provides intermittent tumbling of clothes in order to prevent setting of wrinkles and provides this anti-wrinkle operation over an extended period of time while utilizing only a small portion of the timer dial for this anti-wrinkle function.

2. Description of the Prior Art

In U.S. Pat. No. 3,286,359, issued Nov. 22, 1966 and assigned to Whirlpool Corporation, Carrol A. Orr and Samuel J. Miller disclose the use of an auxiliary timer operated cam for pulsing the drive motor of a dryer to provide an intermittent fluffing action during a cool down interval. In another embodiment, the timer is still employed; however, the intermittent operation of the drive motor is provided by a thermal switch which comprises a bimetallic switch contact.

The art also generally recognizes the provision of shiftable gears for driving a plurality of gear trains at different speeds. In U.S. Pat. No. 3,571,945, issued Mar. 23, 1971 and assigned to Whirlpool Corporation, Alvin J. Elders discloses a dryer control which includes two camstacks, one of which operates continuously to pulse the dryer drive motor and the other of which is engaged and disengaged with the dryer motor under the control of a bimetal strip connected in series with the dryer motor to control the dryer operational cycles. The art further recognizes other techniques for shifting gears to provide driving plural gear trains at different speeds.

SUMMARY OF THE INVENTION

It is highly desirable and the primary object of this invention to provide intermittent tumbling of the clothes in a clothes dryer during an extended interval or anti-wrinkle cycle after the drying process is complete, as an anti-wrinkle function, while timing the anti-wrinkle cycle under the control of the timer motor, and more specifically while utilizing only a small portion of the timer dial for the anti-wrinkle cycle.

A multispeed timer dryer control is provided, according to the invention, with a first cam for operating contacts to periodically pulse the dryer drive motor, and a second cam for shifting gears in the gear train between the timer motor and the program control camstack and timer dial so that the camstack and timer dial rotate only a small amount during an anti-wrinkle cycle. The first cam is mounted for mutual rotation with a gear which is engaged with a gear or output pinion of the timer motor. This cam is so dimensioned and its speed of rotation, in the embodiment discussed below, is such as to energize the drive motor for 10 seconds for each revolution of the cam, the cam rotating at 1/5 rpm. The other or second cam is constructed in the form of a face cam on the side of one cam in the camstack. A cam follower for this cam is in the form of an axially slidable and rotatable shaft which carries a first gear engaged in a gear train to the timer motor and a second gear for engagement with a gear carried by the camstack shaft. The second gear carried by the axially shiftable shaft has, in the embodiment discussed below, a first number of teeth thereabout at one axial position and a second number of teeth thereabout at another axial position. Shifting of the shaft therefore places the teeth of one of the two sections in engagement with the gear carried by the camstack shaft and provides rotation of the camstack shaft at different speeds. In the embodiment set forth in detail below, 12 teeth are provided on one section of the axially movable gear and one tooth is provided on the other section of that gear for a speed reduction of 1/12 during the anti-wrinkle cycle. With the face cam occupying 30° and the normal speed of rotation of the camstack shaft gear at 1/120 rpm, 120 minutes will be necessary for the cam to rotate to a point where the axially shiftable shaft returns from its shifted position. During this interval, the drive motor will be pulsed to operate for ten seconds every five minutes. It is therefore readily apparent that an extended cool down period may be provided by employing only a small portion of the timer dial.

BRIEF DESCRIPTION OF THE DRAWINGS

Other objects, features and advantages of the invention, its organization, construction and operation will be best understood from the following detailed description of a preferred embodiment thereof taken in conjunction with the accompanying drawings, on which.

DESCRIPTION OF THE PREFERRED EMBODIMENTS

Figure 1:
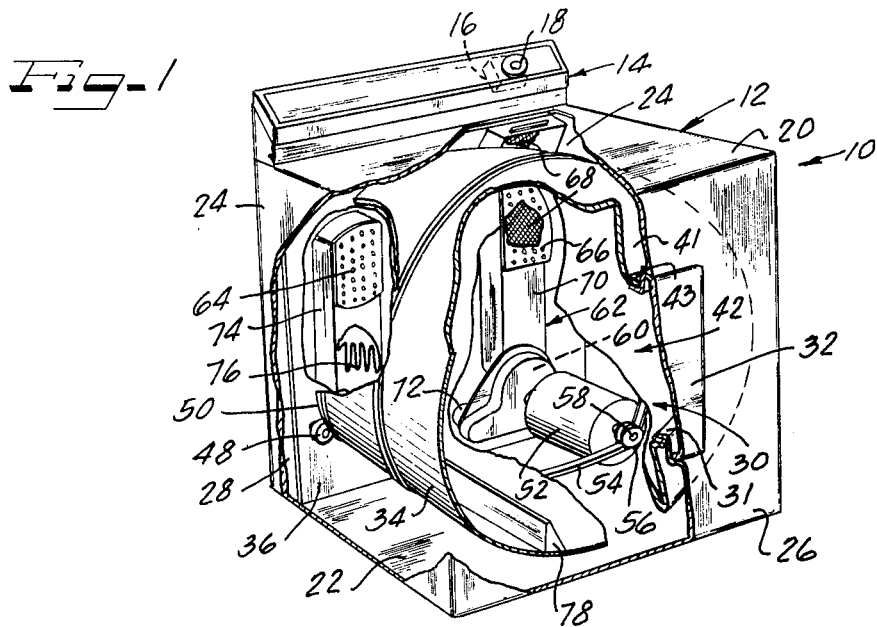
FIG. 1 is a perspective view of a dryer which may utilize the present invention.

Referring to FIG. 1, the environment for a multispeed timer dryer control is illustrated. A clothes drying appliance 10 is shown as comprising an enclosure cabinet 12 having a control console 14 mounted thereon and housing a control device 16 for regulating the drying operation. The control device 16 includes a manually operable control knob 18 for selectively setting the control device 16 for various drying cycles of operation, as, for example, automatic or timed drying cycles.

The enclosure cabinet 12 comprises a horizontal top panel 20 and a horizontal bottom panel 22, a pair of vertical side panels 24, a vertical front panel 26 and a vertical rear panel 28. An access opening 30 is provided in the front panel 26 and is defined by an axially in-turned flange 31. The access opening 30 has a closure door 32 cooperating therewith for loading and unloading the dryer 10.

The dryer 10 further includes a drying container for tumbling clothes in the form of a revolving drum 34 housed within the cabinet 12 and extending axially from the front panel 26 to a bulkhead 36 which is spaced forwardly of the rear panel 28. To encourage tumbling action in the clothing being dried, a plurality of circumferentially spaced baffles 78 (only one being illustrated) are mounted on the inner surface of the drum 34. The drum 34 includes a radially inwardly extending front closure wall 41 having an access opening 42 therein formed by means of an axially out-turned flange 43. The flange 43 provides a forwardly extending bearing annulus which overlies and is suitably journaled on the complementary flange 31 of the front panel 26. It will be apparent from the foregoing that the opening 42 into the drum and the opening 30 formed in the front panel 26 are concentric, providing access into the rotatable drum 34 from outside of the cabinet 12. The drum 34 is supported at the rear by a pair of support rollers 48 (only one being illustrated) which are mounted on the bulkhead 36. A raceway or circumferential groove 50 indented in the peripheral wall of the rear portion of the drum 34 serves as a track for the rollers 48.

A motor 52, mounted to the bottom panel 22 in a rear corner of the cabinet 12, rotatably drives the drum 34 by means of a drive belt 54 which extends around the periphery of and in frictional engagement with the drum 34 and around a motor pulley 56 mounted at one end of a motor shaft 58. The other end of the motor shaft 58 drives a blower 60 which is arranged to circulate air through the drum 34. The blower 60 is included in a warm air system 62 positioned between the rear panel 28 and the bulkhead 36.

In the warm air system 62, the bulkhead 36 serves to enclose the open-ended rear portion of the drum 34 and provides a fixed rear wall in which to locate a pair of spaced openings, comprising an air inlet 64 and an air outlet 66. The blower 60 draws moisture-laden air from the interior of the drum 34 through the outlet 66, through a removable lint screen 68 and an air duct 70 to the blower 60, and then blows the air out of the cabinet through an exhaust duct 72. Air exhausted from the drum 34 is replaced by ambient air entering the warm air system 62 by way of an intake opening in the rear panel 28 (not shown) and is drawn through a fresh air duct 74, passing over a heater means 76 and into the drum 34 through the inlet 64. The warm air system 62 thus circulates a stream of warm air through the drum 34 subjecting the clothing placed therein to a drying environment to remove moisture from the fabrics while the clothing is tumbled as the drum rotates.

Figure 2:
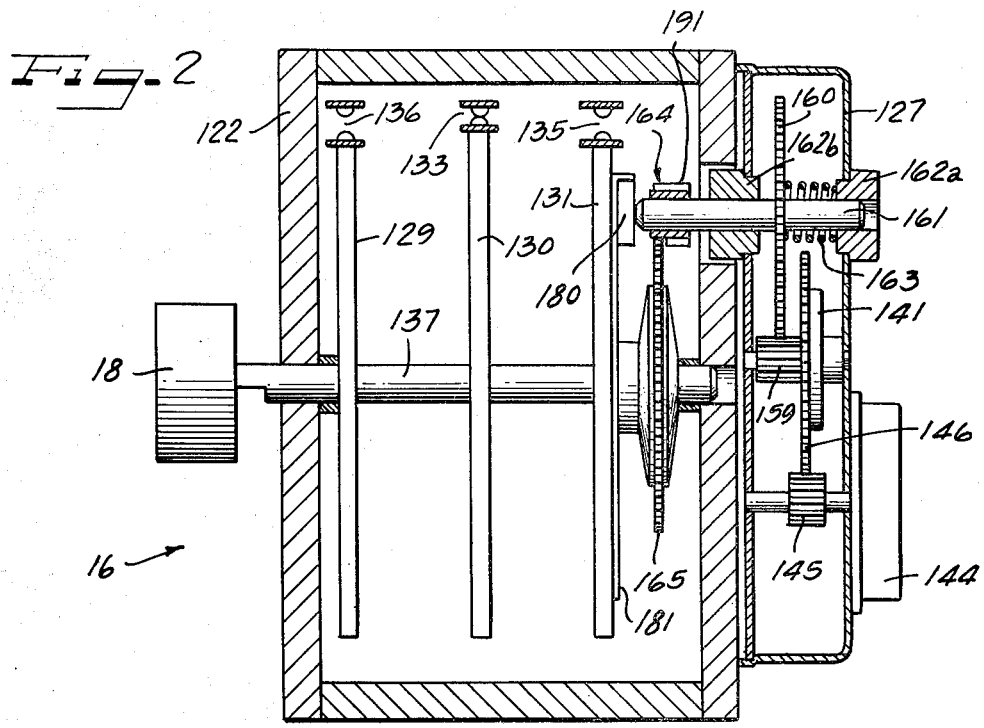
FIGS. 2 and 3 are partial sectional views of the timer of the dryer illustrated in FIG. 1, FIG. 2 illustrating the timer in one operational condition and FIG. 3 illustrating the timer in another operational condition.
Figure 3:
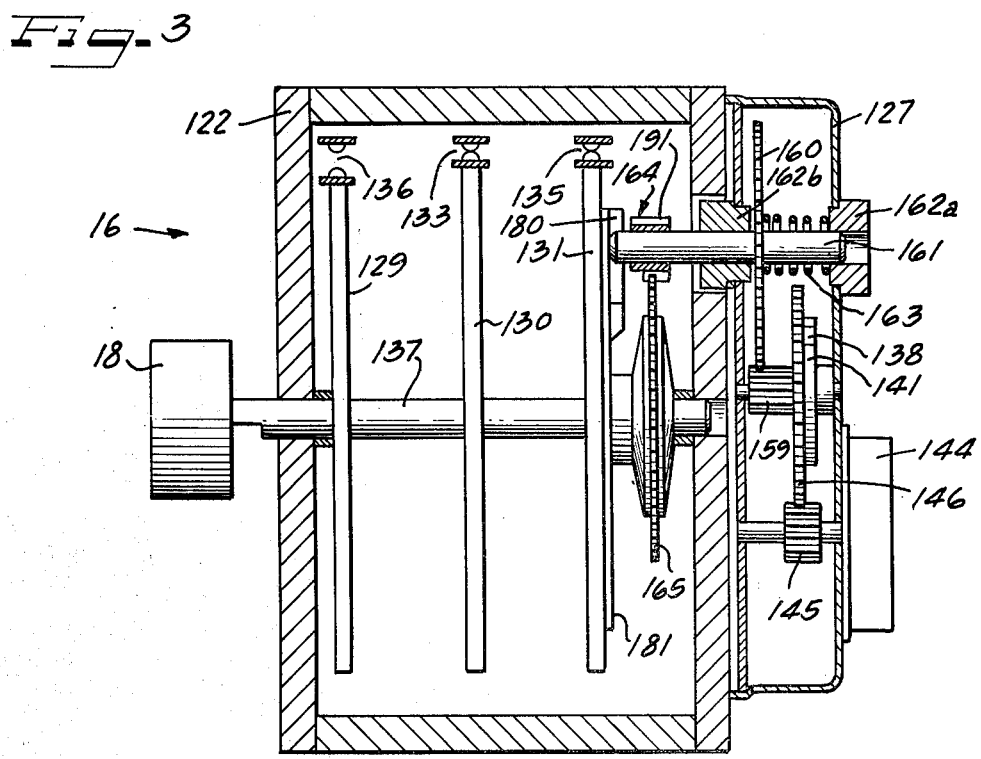
Figure 4:
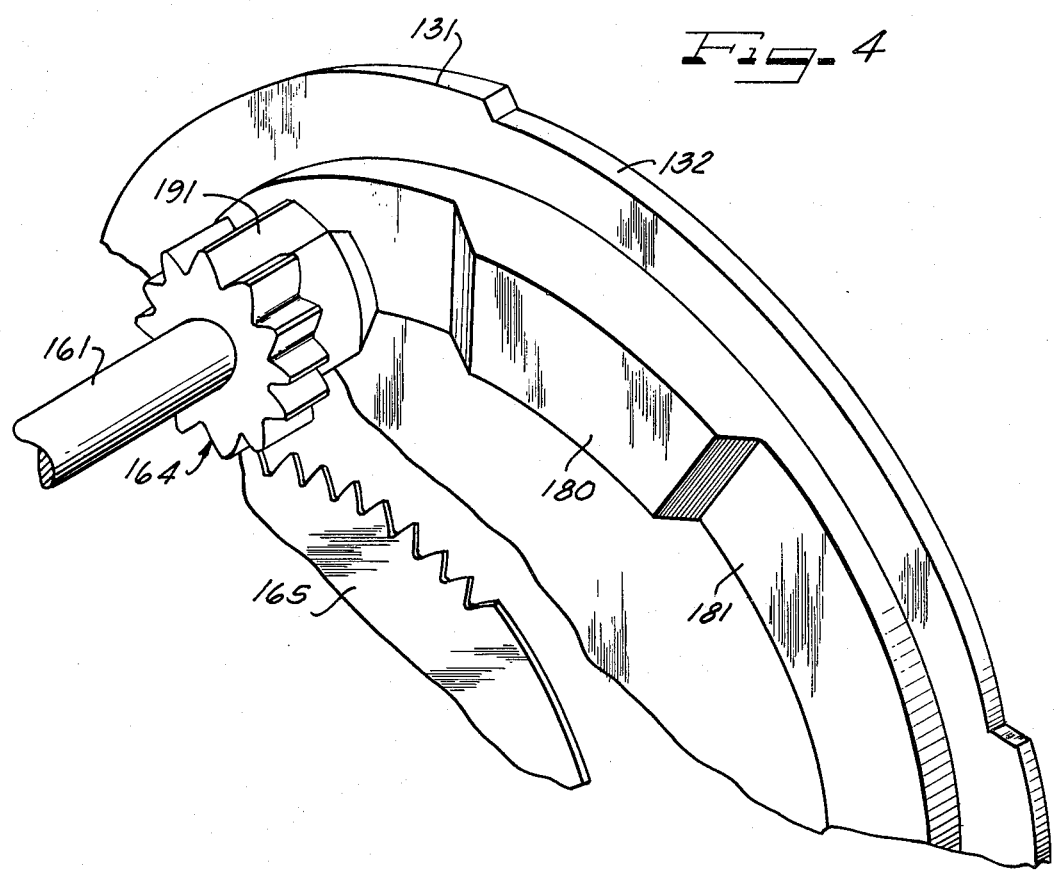
FIG. 4 is a fragmentary perspective view of the gear shifting apparatus of FIGS. 2 and 3.

Referring now to FIGS. 2 and 3, a partial sectional view of the timer 16 is shown. The timer 16 includes a casing 122 which houses a camstack having cams 129, 130 and 131 carried on an and with a shaft 137. The cams 129, 130 and 131 control respective switch contacts 136, 133 and 135. One end of the shaft 137 protrudes through the casing 122 and mounts the control handle 18 at the distal end thereof. The other end of the shaft 137 has a gear 165 secured thereon to provide rotational movement of the cams under the control of a timer motor 144 and via an intermediate gear train. A housing 127 is attached to the casing 122 and has the timer motor 144 mounted on one side thereof. The timer motor 144 is connected to drive the gear 165 by way of a gear train including gears 145, 146, 159, 160 and 164. A cam 141 is mounted for mutual rotation with the gear 146 and includes one lobe 138. The gear 164 is mounted on an axially movable and rotatable shaft 161. The shaft 161 is slidable in a pair of bearings 162a and 162b, and is biased against a camming surface 181 on the side face of the cam 131 by means of a spring 163 which is carried about the shaft 161 and bears against the gear 160 and the bearing 162a. The cam surface 181 includes a cam lobe 180 which cooperates with the shaft 161 and the gear 164 (as a cam and a cam follower mechanism) to provide two speeds of rotation of the gear 165 as is more clearly illustrated in FIG. 4. The gear 164 comprises twelve teeth, a tooth 191 being longer along the axis of rotation than the other teeth. As the cam 131 rotates, the gear 164 biased by the spring 163 against the cam surface 181, drives the gear 165 through all twelve teeth (FIG. 3).

When the shaft 161 contacts the lobe 180 it is moved axially to the right as illustrated in FIG. 2 so that only the tooth 191 is available for engagement with the gear 165. The speed of rotation of the gear 165 is therefore reduced to 1/12 of its former speed whenever the shaft 161 is moved axially by the cam lobe 180. It is readily apparent that during this interval each increment on the timer dial is multiplied in time by 12.

Figure 5:
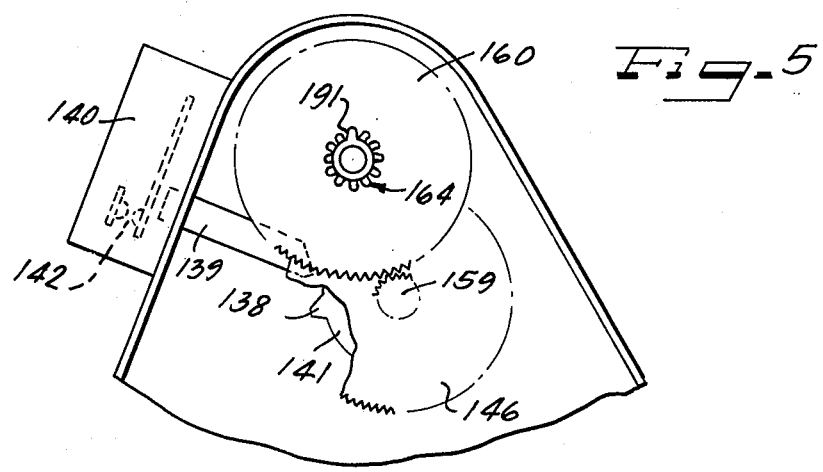
FIG. 5 is a schematic representation which illustrates the relationship of the anti-wrinkle switch and its controlling cam.

Referring now to FIG. 5, the cam 141 is depicted in greater detail. The cam lobe 138 operates a switch actuator in the form of a plunger 139 once each revolution of the cam 141 to actuate a set of switch contacts 142 of a switch 140. In the preferred embodiment shown, the cam 141 rotates at 1/5 rpm and the lobe 138 closes the contacts 142 for 10 seconds.

Figure 6:
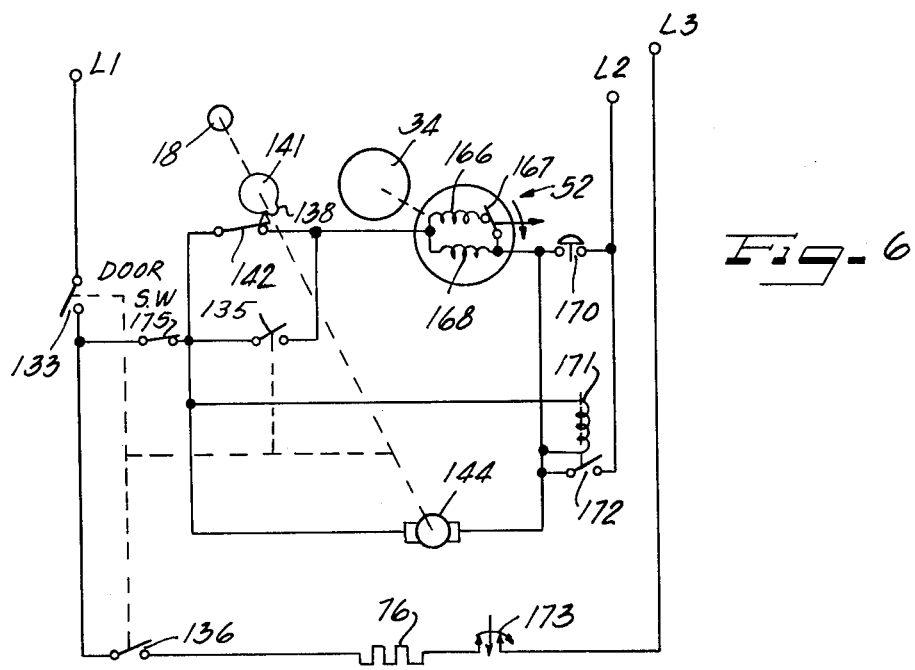
FIG. 6 is a schematic circuit diagram of a dryer control circuit which utilizes the timer of the present invention and which may be used for the dryer illustrated in FIG. 1.
Figure 7:
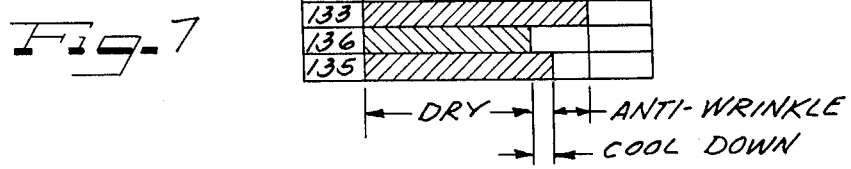
FIG. 7 is a timer schedule showing the closing of the timer contacts of FIG. 6.

Referring now to FIGS. 6 and 7, connection of the aforedescribed timer with other elements to form a control circuit for a dryer is illustrated. Terminals L1, L2 and L3 are provided in accordance with usual constructions of laundry drying apparatus for connection to a commercial electrical supply. The heating portion of the circuit is generally connected across the terminals L1 and L3, usually 240 volts, 60 Hz, and includes the series connection of the switch contacts 133 and 136, the heating element 76 and a centrifugal switch 173 which is operated by rotation of the drive motor 52. The remainder of the dryer control circuit is connected across the terminals L1 and L2, usually 120 volts, 60 Hz, and includes the switch contacts 133, a door operated switch 175, the contacts 142 of the switch 140, the dryer motor 52 and a normally open push to start switch 170. The circuit also comprises the switch contacts 135 connected in shunt relation to the contacts 142, the timer motor 144 connected between the door switch 175 and the push to start switch 170 and a relay winding 171 connected in shunt relation to the timer motor 144 and having relay contacts 172 connected in shunt relation to the push to start switch 170 for maintaining the circuit energized upon release of the push to start switch. The mechanical driving connections between the timer motor 144 and the timer contacts have been illustrated by broken lines, particularly the driving connection between the timer motor 144 and the cam 141 and between the cam 141 and its associated contacts 142.

The dryer motor 52 includes a start winding 166, a centrifugal switch 167 for removing the start winding from the circuit at a certain motor speed and a run winding 168. The dryer motor 52 is coupled to rotate the drum 34 which receives wet laundry.

Upon closure of the door 32, which in turn closes the door switch 175, and manual operation of the timer dial knob 18 to close the contacts 133, 135 and 136, the push to start switch 170 is momentarily operated to complete an operating circuit for the relay winding 171 over the path including the terminal L1, the contacts 133, the contacts 175, the winding 171, the switch 170 and the terminal L2. Energization of the winding 171 causes closure of the contacts 172 to provide continuity of the electrical circuit across the contacts 170 upon release of the switch 170. Electrical energy is also supplied by way of the contacts 133, the contacts 175 and the contacts 135 to the windings 166 and 168 of the motor 52. The motor begins to rotate and upon reaching a certain speed the contacts 167 open to remove the winding 166 from the circuit. The centrifugal switch 173 operates to complete the heater circuit over the contacts 133 and 136 to energize the heating element 76 so that drying may begin.

After the drying cycle of the program has been completed, the contacts 136 will be opened to open the energization circuit of the heating elements 76. This terminates the drying cycle and initiates the cool down cycle. After a predetermined time, the contacts 135 will be opened to deenergize the motor 52 and initiate the anti-wrinkle cycle; however, the timer motor 144 and the relay 171 are not affected by the contacts 135 and remain energized. The gear 165 will therefore continue to rotate, rotating the shaft 137 and the cams 129, 130 and 131. As is evident from FIGS. 2, 3 and 4 the cam surface 132 of the cam 131 opens the contacts 135. When the contacts 135 open, the shaft 161 begins to ride up on the cam surfaces of cam lobe 180. The gear 164 is therefore moved axially to another position and only the gear tooth 191 now comes in contact with the gear 165. The gear 165 is therefore driven at 1/12 of the previous speed and therefore the cam 131 now rotates very slowly. When the switch contacts 135 open, the contacts 142 of the switch 140 are no longer shunted by the contacts 135. Therefore, as the cam 141 rotates and closes the contacts 142 for ten seconds in each revolution, the drive motor 52 will be energized to tumble the drum 34 and the clothes within the drum 34 will be tumbled for that ten second period of time. The drive motor 52 will continue to operate for ten seconds every revolution of the cam 141 until the shaft 161 ceases to ride on the cam lobe 180 of the cam 131. In the preferred embodiment shown, the gear 165 is rotated at a speed of 1/120 rpm during the drying cycle when the gear 164 is in the position shown in FIG. 3. The cam lobe 180 occupies 30° of the cam 131, or 10 minutes of drying time. However, when the gear 164 is shifted to drive the gear 165 at 1/12 of that speed during the anti-wrinkle cycle (FIG. 2), it will take 120 minutes for the cam 131 to rotate to the point where the shaft 161 returns to the cam surface 181. During this period, the cam lobe 138 will actuate the switch contacts 142 for 10 seconds of every 5 minutes. At the time that the shaft 161 returns to the surface 181, the cam 130 will open the contacts 133 and operation of the dryer will cease.

From the foregoing it can be seen that the objects of the invention have been fulfilled in that an intermittent tumbling of the clothes within the drum after the drying operation has ceased has been provided over an extended period of time while utilizing only a small angular rotation of the timer dial 18.

I have disclosed my invention by reference to a specific illustrative embodiment of a two speed timer. However, it will be appreciated that the principle may be extended to provide many speeds by the addition of more face cam surfaces on cam 131 and a multiple of axial positions on gear 164 having different numbers of teeth. Although one form of a multispeed timer has been disclosed in the illustrated embodiment of the invention, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

The embodiments of the invention in which an exclusive property or privilege is claimed are defined as follows:

1. A clothes dryer comprising:
    a drive motor for connection to an electrical supply;
    a timer including a timer motor for connection to the electrical supply, a plurality of sets of program contacts operable in a programmed sequence, a plurality of program cams driven by said timer motor to operate said plurality of contacts, pulsing contacts connected between said drive motor and the electrical supply, and a pulsing cam driven by said timer motor for periodically operating said pulsing contacts,
    and means for changing the speed of operation of said program contacts at a predetermined time during the program for a predetermined interval;
    a rotatable drum driven by said drive motor for receiving a clothes load;
    heater means connected to the electrical supply via a first set of said program contacts for providing a flow of heated air to the clothes in said drum during a drying cycle; a second set of said program contacts shunting said pulsing contacts until said predetermined time whereupon said drive motor is periodically operated to intermittently tumble the clothes in said drum during said predetermined interval to prevent wrinkling of the clothes; and
    a third set of said program contacts connected between said drive motor and the electrical supply and operated at the end of said predetermined interval to terminate a drying program,
    said means for changing the speed of operation of said program contacts comprises a gear train connecting said timer motor to said program cams including a gear shifting arrangement operated by one of said program cams and
    wherein said gear shifting arrangement comprises a first gear connected to said program cams, a second gear for engagement with said first gear and including at least two gear sections axially thereof having different numbers of teeth and an axially displaceable shaft carrying said second gear and axially movable in response to rotation of said one program cam to change the gear ratio between said first and second gears.

2. A clothes dryer comprising:
    a drive motor for connection to an electrical supply;
    a timer including a timer motor for connection to the electrical supply, a plurality of sets of program contacts operable in a programmed sequence, a plurality of program cams driven by said timer motor to operate said plurality of contacts, pulsing contacts connected between said drive motor and the electrical supply, and a pulsing cam driven by said timer motor for periodically operating said pulsing contacts, and means for changing the speed of operation of said program contacts at a predetermined time during the program for a predetermined interval;

a rotatable drum driven by said drive motor for receiving a clothes load;

heater means connected to the electrical supply via a first set of said program contacts for providing a flow of heated air to the clothes in said drum during a drying cycle;

a second set of said program contacts shunting said pulsing contacts until said predetermined time whereupon said drive motor is periodically operated to intermittently tumble the clothes in said drum during said predetermined interval to prevent wrinkling of the clothes; and a third set of said program contacts connected between said drive motor and the electrical supply and operated at the end of said predetermined interval to terminate a drying program, said means for changing the speed of operation of said program contacts comprising:

a housing;

a first shaft rotatably mounted in said housing and mounting said program cams, a first gear mounted on said first shaft; and a gear train connecting said timer motor to said first gear, said gear train including a second shaft mounted to said housing for rotational and axial movement, a gear mounted on said second shaft for movement therewith and comprising two axially distinct sections having different numbers of gear teeth for engagement with said first gear, and means biasing said second shaft toward a position where one of said sections of said gear mounted on said second shaft engages said first gear, one of said cams including a cam surface contacting said second shaft and including a cam lobe for axially displacing said second shaft to shift engagement between said first gear and the sections of said second gear.

* * * * *